US 9,271,595 B2

(12) United States Patent
Lee

(10) Patent No.: US 9,271,595 B2
(45) Date of Patent: Mar. 1, 2016

(54) LID FOR VACUUM COOKING POT AND COOKING POT USING SAME

(71) Applicant: HAPPYCALL CO., LTD., Gimhae-si, Gyeongsangnam-do (KR)

(72) Inventor: Hyun sam Lee, Busan (KR)

(73) Assignee: HappyCall Co., Ltd., Gimhae-si (KR)

( * ) Notice: Subject to any disclaimer, the term of this patent is extended or adjusted under 35 U.S.C. 154(b) by 0 days.

(21) Appl. No.: 14/358,660

(22) PCT Filed: Mar. 26, 2013

(86) PCT No.: PCT/KR2013/002493
§ 371 (c)(1),
(2) Date: May 15, 2014

(87) PCT Pub. No.: WO2013/151264
PCT Pub. Date: Oct. 10, 2013

(65) Prior Publication Data
US 2014/0305947 A1 Oct. 16, 2014

(30) Foreign Application Priority Data

Apr. 5, 2012 (KR) .................. 10-2012-0035485
Apr. 5, 2012 (KR) .................. 10-2012-0035486
Nov. 22, 2012 (KR) .................. 10-2012-0133205

(51) Int. Cl.
*A47J 27/08* (2006.01)
*B65D 45/16* (2006.01)
(Continued)

(52) U.S. Cl.
CPC .............. *A47J 27/08* (2013.01); *A47J 27/0804* (2013.01); *A47J 27/092* (2013.01); *A47J 36/06* (2013.01);
(Continued)

(58) Field of Classification Search
CPC .... B65D 45/16; B65D 51/16; B65D 51/1605; B65D 51/1644; B65D 51/1611; B65D 51/1633; B65D 18/2007; B65D 18/2015; B65D 18/2038; B65D 2525/287; B65D 2525/284; B65D 2525/283; B65D 2543/00861; B65D 2543/0087; B65D 2543/00953; B65D 2543/00972; A47J 27/08; A47J 27/0804; A47J 27/0811; A47J 27/0813; A47J 27/09; A47J 27/092; A47J 36/10; A47J 45/066; Y10S 220/912
See application file for complete search history.

(56) References Cited

U.S. PATENT DOCUMENTS 2,670,755 A * 3/1954 Kendrick ...................... 137/467
2,843,440 A * 7/1958 Billig et al. ................... 312/284
(Continued)

FOREIGN PATENT DOCUMENTS

CN        2368414       3/2000    ............. A47J 27/08
CN       201079295      7/2008    ............. A47J 36/06
(Continued)

OTHER PUBLICATIONS

International Searching Authority/KR, International Search Report, International Application No. PCT/KR2013/002493, dated Jun. 24, 2013, 2 pages.
(Continued)

*Primary Examiner* — Anthony Stashick
*Assistant Examiner* — Mollie Llewellyn
(74) *Attorney, Agent, or Firm* — Sunstein Kann Murphy & Timbers LLP

(57) ABSTRACT

A lid handle having vacuum and overflow prevention function is installed in a lid for a vacuum cooking pot, the lid being locked to a container using a locking member installed in a container handle. The lid handle may have a check valve having an open-close flange, a top unit, a central hole flange, a connecting section connecting the open-close flange with the central hold flange to form a relief path, and a flange formed in between the top unit and the open-close flange. The locking member may include a locking slider, a guide member for guiding the locking slider, and an elastic clip that determines the position of the locking slider.

14 Claims, 11 Drawing Sheets

(51) Int. Cl.
*B65D 51/16* (2006.01)
*B65D 81/20* (2006.01)
*A47J 36/06* (2006.01)
*A47J 27/092* (2006.01)
*F16J 15/02* (2006.01)

(52) U.S. Cl.
CPC ............ *B65D 45/16* (2013.01); *B65D 51/1644* (2013.01); *B65D 81/2015* (2013.01); *B65D 2525/284* (2013.01); *B65D 2525/287* (2013.01); *B65D 2543/00879* (2013.01); *B65D 2543/00972* (2013.01); *F16J 15/028* (2013.01)

(56) References Cited

U.S. PATENT DOCUMENTS

| | | | | |
|---|---|---|---|---|
| 3,880,187 | A * | 4/1975 | Kneusel | 137/843 |
| 5,011,035 | A * | 4/1991 | Subramanian | 220/203.29 |
| 5,724,884 | A * | 3/1998 | Fischbach | 99/337 |
| 5,927,183 | A * | 7/1999 | Lee | 99/337 |
| 6,877,633 | B2 * | 4/2005 | Niese | 220/315 |
| 2005/0139089 | A1 * | 6/2005 | Seurat Guiochet et al. | 99/403 |
| 2011/0259897 | A1 | 10/2011 | Coursey et al. | 220/592.03 |
| 2014/0353316 | A1 * | 12/2014 | Lin | 220/573.1 |

FOREIGN PATENT DOCUMENTS

| | | | |
|---|---|---|---|
| CN | 202122471 | 1/2012 | A47J 27/08 |
| JP | S57-052416 | 3/1982 | A47J 27/08 |
| JP | S57-052422 | 3/1982 | A47J 27/08 |
| JP | H07-018501 | 1/1995 | A41B 9/02 |
| JP | H09-252953 | 9/1997 | A47J 27/08 |
| JP | 2005-0052546 | 3/2005 | A47J 27/08 |
| JP | 2005-0211261 | 8/2005 | A47J 27/212 |
| JP | 2007-0190168 | 8/2007 | A47J 27/08 |
| JP | 2009-201857 | 9/2009 | A45C 11/20 |
| KR | 10-0257616 | 3/2000 | A47J 47/02 |
| KR | 100257616 B1 | 6/2000 | A47J 47/02 |
| KR | 10-0845585 | 7/2008 | A47J 36/06 |
| KR | 20-20080004792 | 10/2008 | A47J 36/06 |
| KR | 20-2010-0000110 | 1/2010 | A47J 36/06 |
| KR | 2020100000110 | 1/2010 | A47J 36/06 |
| KR | 10-2010-0055189 | 5/2010 | A47J 27/56 |
| KR | 100257616 B1 | 6/2010 | A47J 47/02 |
| KR | 10-0988212 | 10/2010 | A47J 27/092 |
| KR | 20-0450617 | 10/2010 | A47J 36/06 |
| KR | 100988212 B1 | 10/2010 | A47J 27/092 |
| KR | 10-2011-0002116 | 1/2011 | A47J 36/02 |
| KR | 20-2011-0003019 | 3/2011 | A47J 27/09 |
| KR | 10-2011-0072862 | 6/2011 | A47J 36/06 |
| KR | 10-2011-0117910 | 10/2011 | A47J 36/06 |

OTHER PUBLICATIONS

State Intellectual Property Office of the People's Republic of China (SIPO), Office Action for Application No. 201380003791.7, dated Mar. 18, 2015, 7 pages.
State Intellectual Property Office of the People's Republic of China (SIPO) (English translation), Office Action for Application No. 201380003791.7, dated Mar. 18, 2015, 7 pages.
Japan Patent Office, Office Action—Refusal reason letter of advice, Application No. 2014-537,013 dated May 29, 2015, 4 pages.
Japan Patent Office (English translation), Office Action—Refusal reason letter of advice, Application No. 2014-537,013 dated May 29, 2015, 3 pages.
European Patent Office, Supplementary European Search Report—Application No. 13772765.7/2759239, dated Mar. 9, 2015, 5 pages.
Canadian Intellectual Patent Office, Office Action for Application No. 2,853,240, dated Aug. 17, 2015, 3 pages.
European Patent Office, Office Action for Application No. 13772765.7, dated Oct. 20, 2015, 4 pages.
State Intellectual Property Office of the People's Republic of China (SIPO), Office Action for Application No. 201380003791.7, dated Oct. 14, 2015, 14 pages.
State Intellectual Property Office of the People's Republic of China (SIPO) [English Translation], Office Action for Application No. 201380003791.7, dated Oct. 14, 2015, 14 pages.

* cited by examiner

PRIOR ART

LID FOR VACUUM COOKING POT AND COOKING POT USING SAME

TECHNICAL FIELD

The present invention relates to a vacuum cooking pot, wherein a lid handle having vacuum and overflow prevention function is installed in a lid for the vacuum cooking pot, and the lid is being locked to a container using a locking member installed in a container handle.

BACKGROUND ART

A vacuum cooking pot of the prior art can be used as a regular pot by exhausting the air through the check valve (or the vacuum release valve) due to the internal expansion of the cooking chamber during boiling.

When it is cooled down after boiling, the inflow of the external air through the check valve (or the vacuum release valve) is blocked due to the internal contraction of the cooking chamber, and performs so called pumping-like function that pulls the lid to downwards direction and creates a vacuum inside such that the lid is stuck to the container thereby preventing separation thereof.

When the contents is stored as it is under a vacuum, spoiling of the food can be prevented as long as the vacuum is maintained thereby solving the inconvenience of continuous boiling thereof.

The vacuum can be released by re-boiling or holding and pushing up the check valve (or the vacuum release valve) (refer to patent literature 1 and 2).

However, the check valve (or the vacuum release valve) of the prior art is made separately from the lid handle, and the handle is holdably formed in the center of the lid therefore the lid cannot be erected.

Meanwhile, as a check valve of the prior art, for example, the one described in the patent literature 3 is disclosed.

As illustrated in FIG. 11, a check valve 120 which is inserted into a mounting hole 116 formed at the bottom surface of the circular pit 118 of the lid body 110, is made of a silicon material and mainly comprised of a body 122, a first flange 125, and a second flange 126.

First, a pressure-relief path 123 is formed inside of the body 122; and a release hole 124 releasing pressure in conjunction with the pressure-relief space 123 is formed in the circumference of the body. Then, a first flange is formed at the lower circumference of the release hole 124 of the body 122 such that the tight contact with the inner surface prevents an arbitrary separation of the body 122 from the mounting hole 116. Finally, a second flange 126 is formed at the upper circumference of the release hole 124 of the body 122 such that the tight contact with the outer surface of the mounting hole 116 and the through-hole 117 prevents downward slipping of the body 122.

However, when the overflow exceeds the release hole 124, the overflow cannot be prevented by the second flange 126 only.

LEADING TECHNICAL LITERATURE

Patent Literature (Patent Literature 1) Korea Utility Model Publication Notification 2008-0004792

(Patent Literature 2) Korea Utility Model Registration Notification 20-0450617

(Patent Literature 3) Korea Utility Model Registration Notification 20-0450617

SUMMARY OF INVENTION

Technical Problem

An objective of the present invention, devised to solve above described problems, is to provide a lid for a vacuum cooking pot capable of simultaneously implementing vacuum and an overflow prevention as well.

Another objective of the present invention is to provide a lid for a vacuum cooking pot that can prevent an overflow while clearly providing and releasing the vacuum.

Yet another objective of the present invention is to provide a lid for a vacuum cooking pot that can practically prevent an overflow while providing a vacuum.

Solution to Problem

To achieve above described objective, a lid for a vacuum cooking pot of the present invention described in claim 1 includes: a lid body; a slot formed at the edge of said lid body; a vacuum packing mounted in said slot; and a lid handle installed in the center of said lid body, wherein said lid handle includes: a central hole unit disposed on the through-hole formed in the center of said lid body; a central cap unit coupled with said central hole unit and supported by said lid body; and a check valve installed inside of said central hole unit.

According to the configuration in claim 1, a vacuum function and an overflow prevention function can be achieved with only one lid handle.

In a lid for a vacuum cooking pot in claim 2 of the present invention, said check valve includes: an open-close flange disposed on the upper surface of the open-close hole formed in said central hole unit; a top unit formed on the top of said open-close flange; a central hole flange disposed under the bottom surface of said open-close hole; a connecting section connecting said open-close flange with said central hole flange to form a relief path; and a flange being formed in between said top unit and said open-close flange.

In a lid for a vacuum cooking pot in claim 3 of the present invention, it is advantageous in that the diameter of said flange is embodied to be greater than that of said open-close flange but smaller than that of the through-hole of said central cap unit.

According to the configuration in claim 3, the flange provides a re-blocking function against the overflowing of foreign substances passing through the open-close flange.

According to a lid for a vacuum cooking pot described in claim 4, it is advantageous in that multiple holes are formed in said flange.

A lid for a vacuum cooking pot described in claim 5 of the present invention can be erected since an arm initiated from the one side of said central cap unit and protruding towards the radial direction of said lid body is further formed.

In a lid for a vacuum cooking pot described in claim 6 of the present invention, a guide piece for guiding steam to upward direction is installed in said central cap unit.

According to the configuration in claim 6, concerns of getting burn from the steam for a user are eliminated by preventing the steam from directing towards the arm.

A vacuum cooking pot of the present invention described in claim 7 includes: a container; a lid for opening and closing said container; and a container handle installed in said container, wherein said lid includes: a lid body; a slot formed at the edge of said lid body; a packing for vacuum mounted inside of said lid slot; and a lid handle installed on the center of said lid body, wherein said lid handle includes: a central hole unit disposed on the through-hole formed in the center of said lid body; a central cap unit coupled with said central hole unit and supported by said lid body; and a check valve installed inside of said central hole unit.

In a vacuum cooking pot of the present invention described in claim 8, it is advantageous in that a lid locking member is further installed in said container handle.

In a vacuum cooking pot of the present invention described in claim 9, said lid locking member includes: a locking slider, a guide member guiding said locking slider towards radial direction with respect to said container handle; and an elastic clip mounted in said container handle and determines the position of said locking slider.

In a vacuum cooking pot of the present invention described in claim 10, said guide member includes: a guide rail formed at the bottom surface of said locking slider; and a guide rail slot section guiding said guide rail section, wherein a said elastic clip for applying an elastic pressure to each side of said guide rail section is disposed in said guide rail slot section.

In a vacuum cooking pot of the present invention described in claim 11, a keep-locking slot and a release-locking slot are formed in said elastic clip, and a protrusion is formed within said guide rail section for coupling with said keep-locking slot or said release-locking slot.

In a vacuum cooking pot of the present invention described in claim 12, a gap maintaining piece for providing a gap between the both sides of said guide rail slot section and said elastic clip is formed.

Advantageous Effects of Invention

According to the present invention, there are following effects.

A vacuum function and an overflow prevention function can be implemented with one lid handle by disposing the check valve in the center of the lid handle.

By further forming an arm in the lid handle, three functions such as a vacuum function, an overflow prevention function, and a leg function when erecting the lid can be implemented with one lid handle.

Besides, by further disposing a flange above the open-close flange of the check valve, the flange provides a function of blocking the overflowed soup passing through the open-close flange to some degree, In addition, multiple holes formed in said flange reduce the bottle neck effect of the steam exhausting between the inside of the central hole cap unit and the flange therefore it prevents condensation of water drops; the surroundings can be protected from being messy, and burns or the like can be prevented by avoiding the splashing of the water drops due to condensation.

In addition, by installing a guide piece in the central hole cap unit, concerns of getting burn for a user are eliminated by guiding the steam towards upward direction not to direction towards the arm (radial direction of the lid).

Meanwhile, by adopting and combining the configuration of a lid locking member which locks the lid, first of all, overflowing on the side is prevented when foods are boiled, and a vacuum can be easily created inside of the container if necessary.

DETAILED DESCRIPTION OF EMBODIMENT

Hereinafter, a preferred exemplary embodiment of the present invention will be described in detail with reference to the accompanying drawings.

Figure 1:
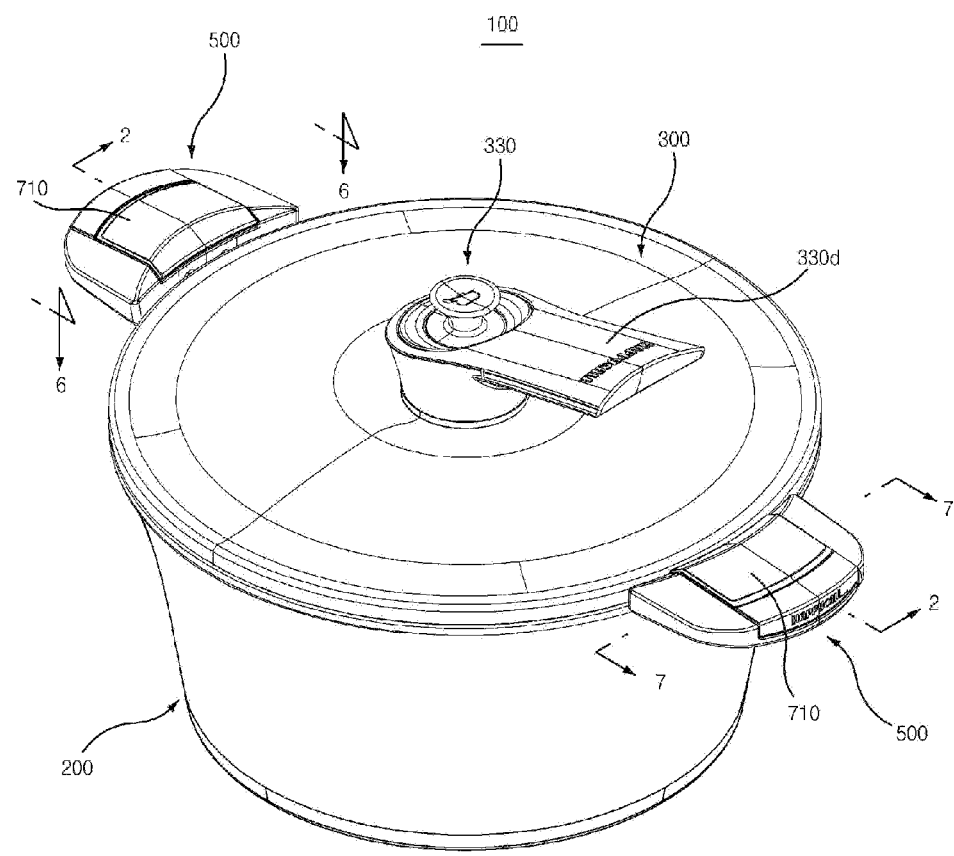
FIG. 1 is a perspective view illustrating a vacuum cooking pot according to a preferred exemplary embodiment of the present invention.
Figure 2:
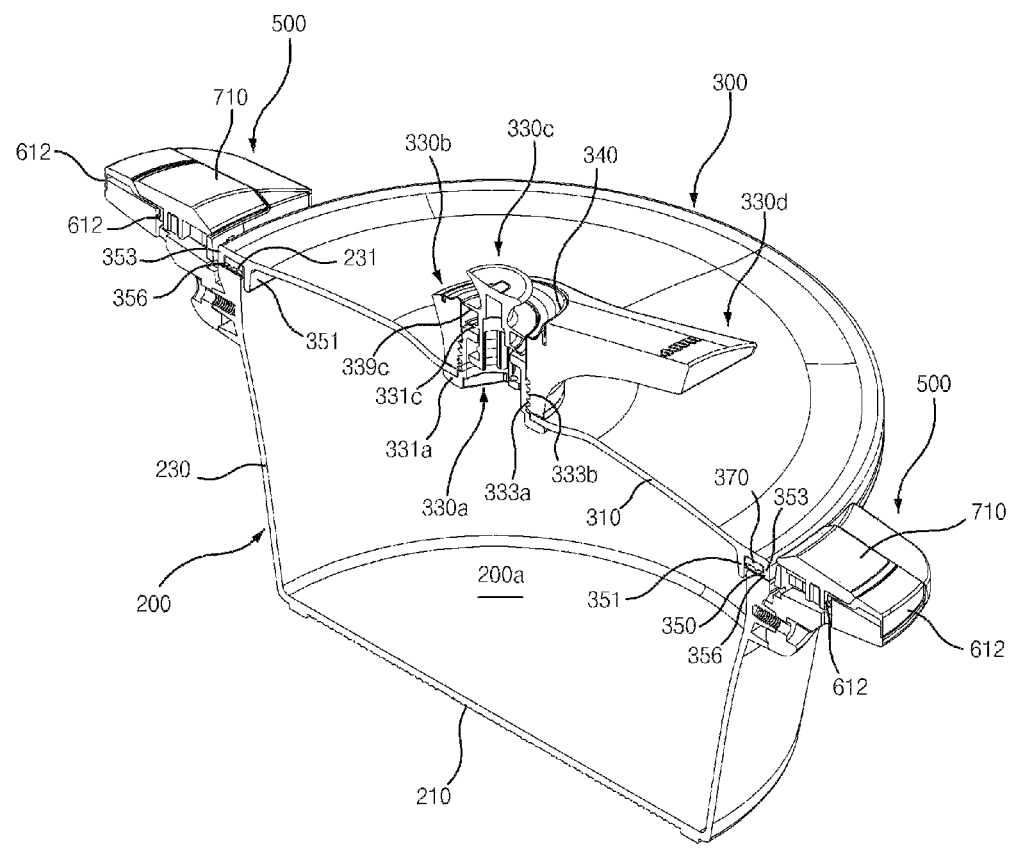
FIG. 2 is a cross-sectional view along the line 2-2 in FIG. 1.
Figure 3:
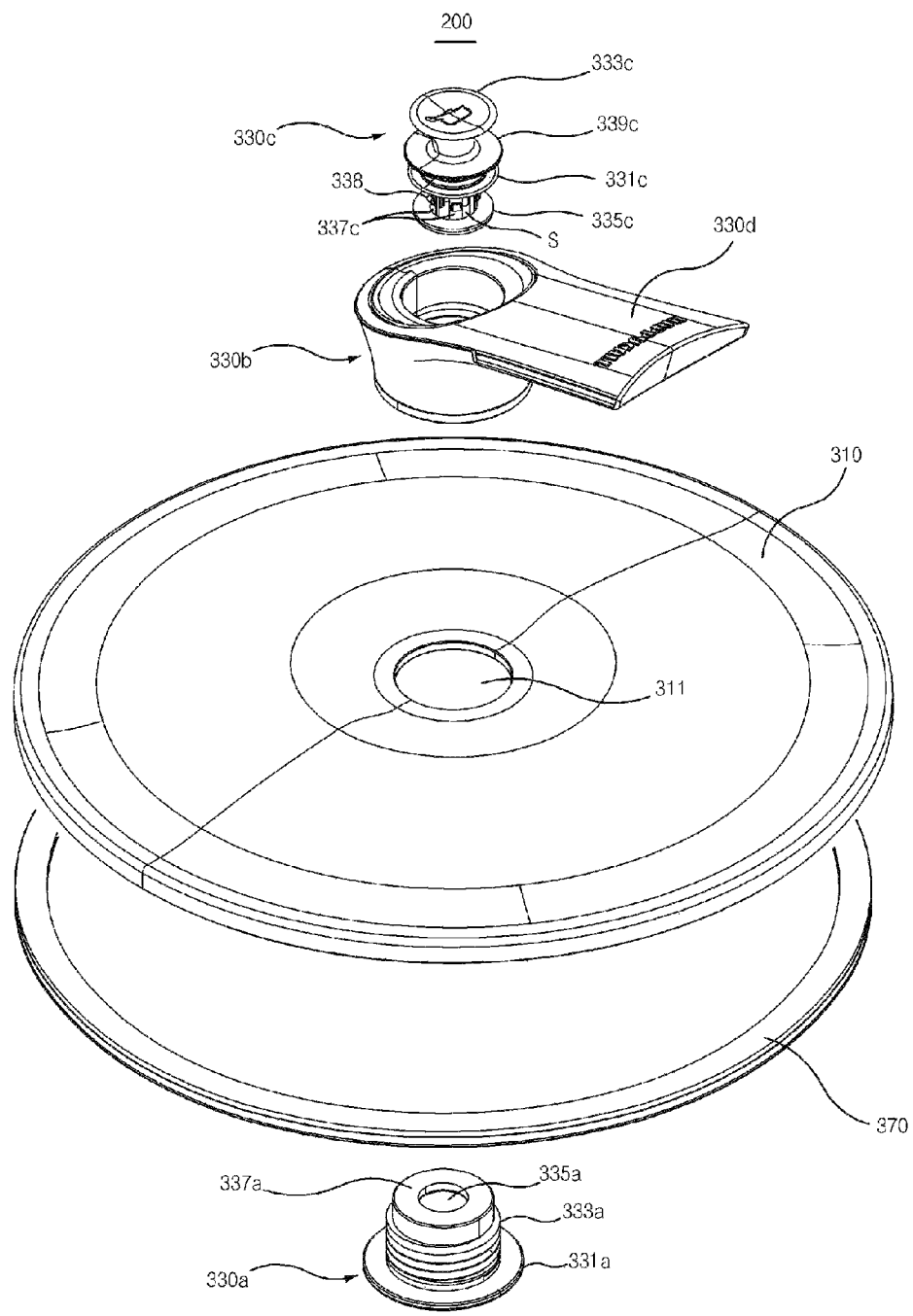
FIG. 3 is an exploded perspective view illustrating the lid in FIG. 1.
Figure 4A:
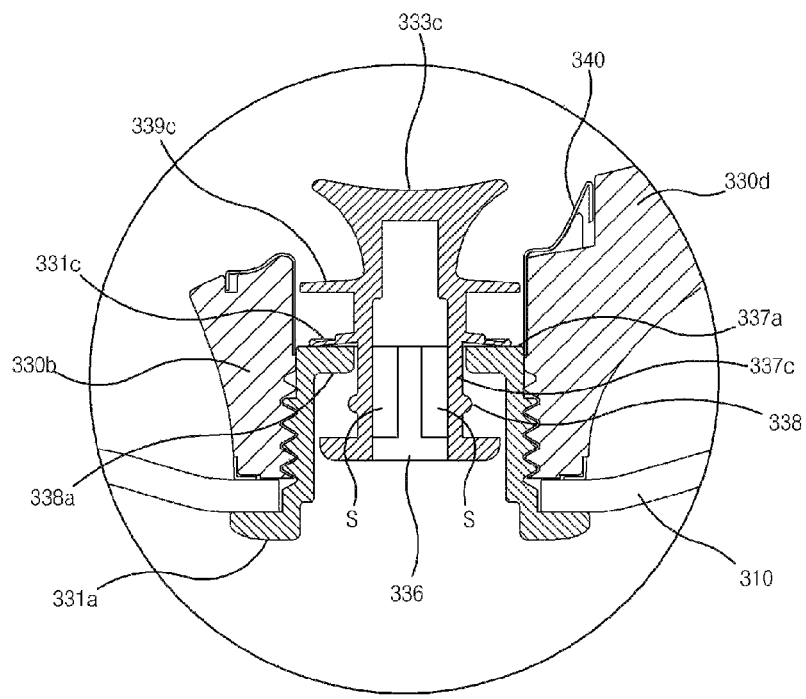
FIG. 4*a* is a cross-sectional view of a check valve when vacuum is maintained.
Figure 4B:
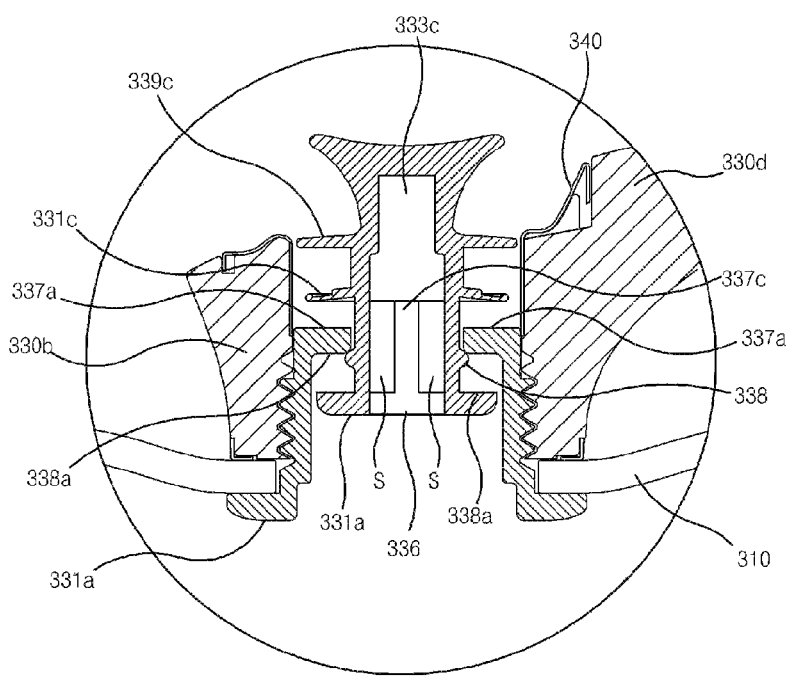
FIG. 4*b* is a cross-sectional view of a check valve when overflow prevention is maintained in accordance with the pressure.
Figure 4C:
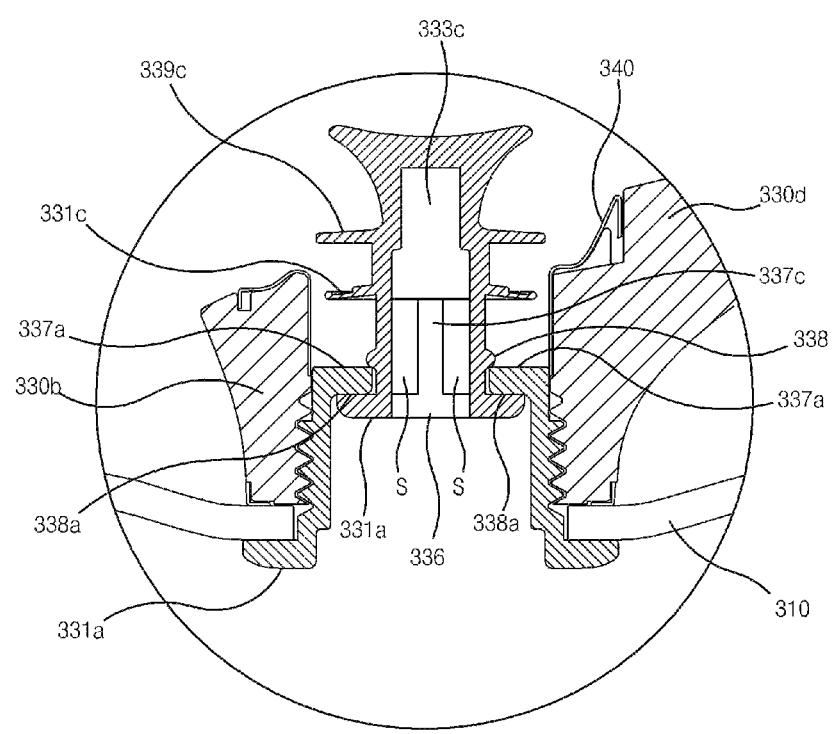
FIG. 4*c* is a cross-sectional view of a check valve when it is always opened.
Figure 5:
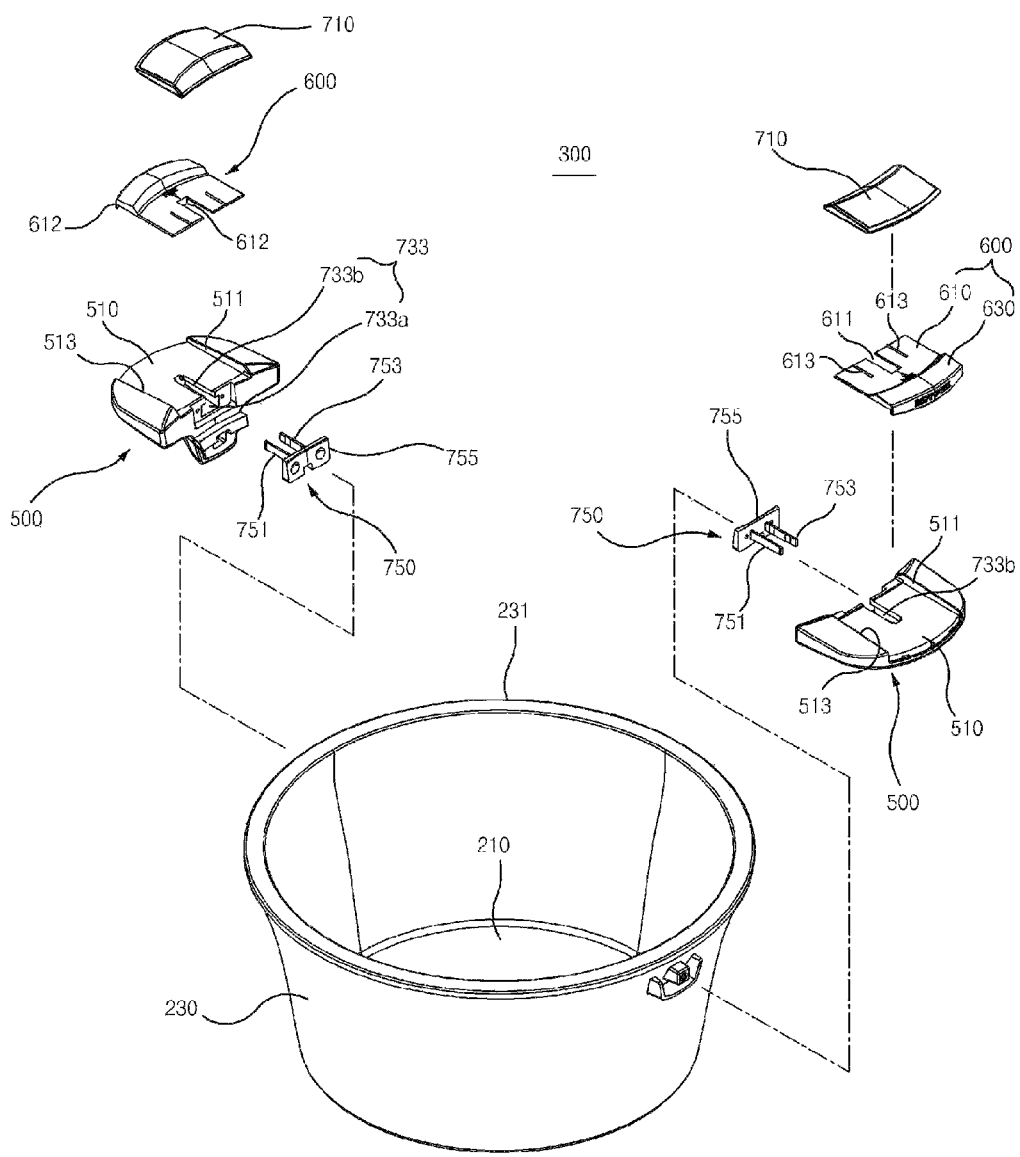
FIG. 5 is an exploded perspective view illustrating a container in FIG. 1.
Figure 6:
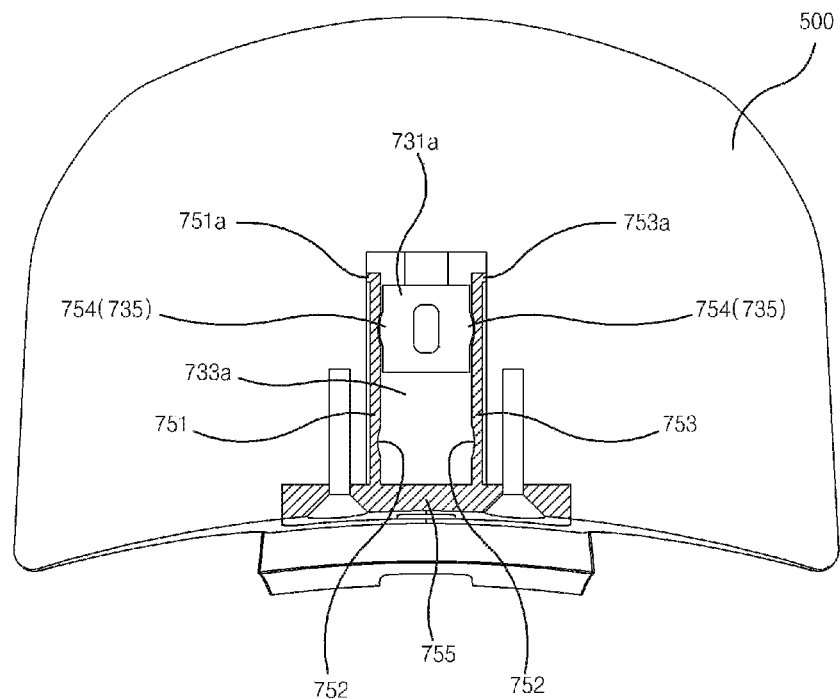
FIG. 6 is a cross-sectional view along the line 6-6 in FIG. 1.
Figure 7:
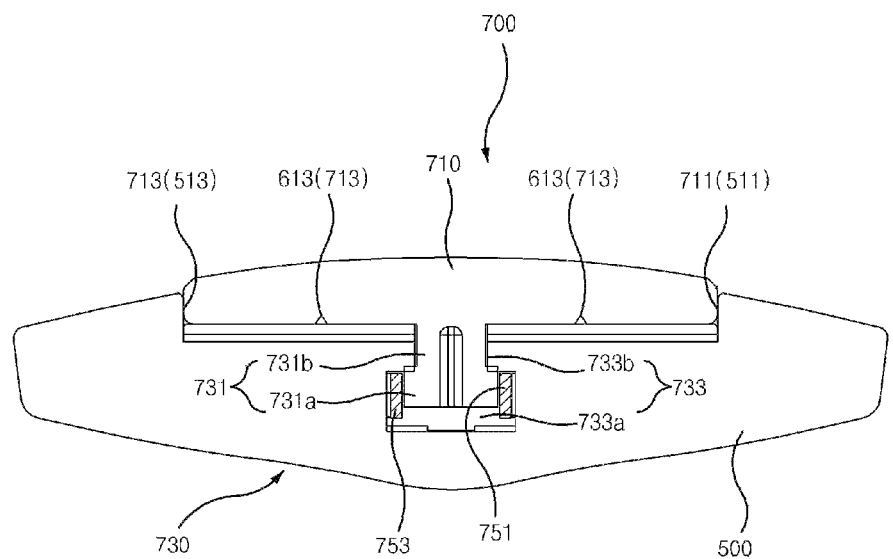
FIG. 7 is a cross-sectional view along the line 7-7 in FIG. 1.
Figure 8:
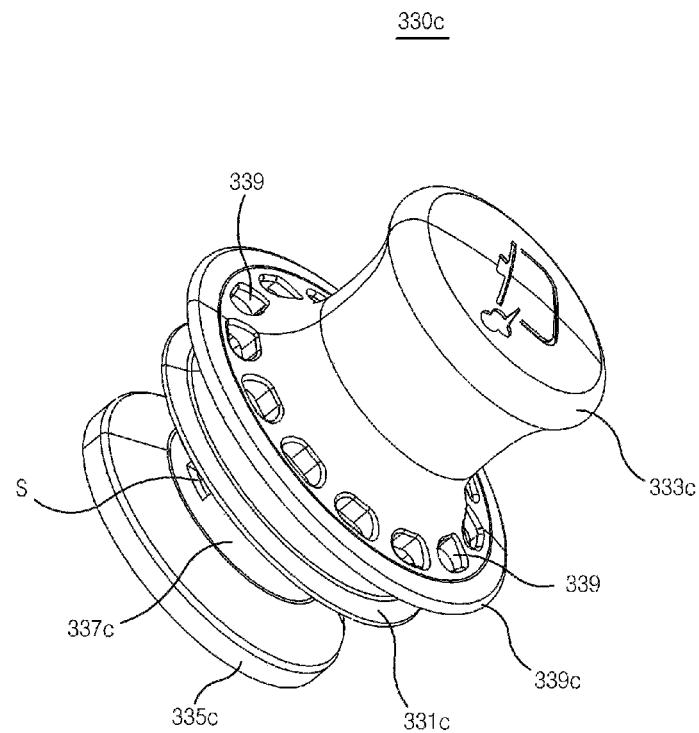
FIG. 8 is a perspective view illustrating another check valve according to another exemplary embodiment.
Figure 9:
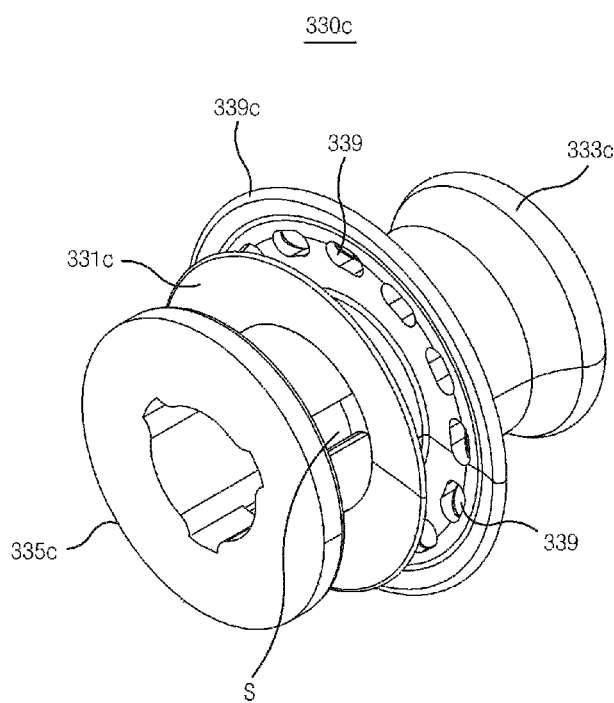
FIG. 9 is a perspective view of FIG. 8 showing the bottom thereof.
Figure 10A:
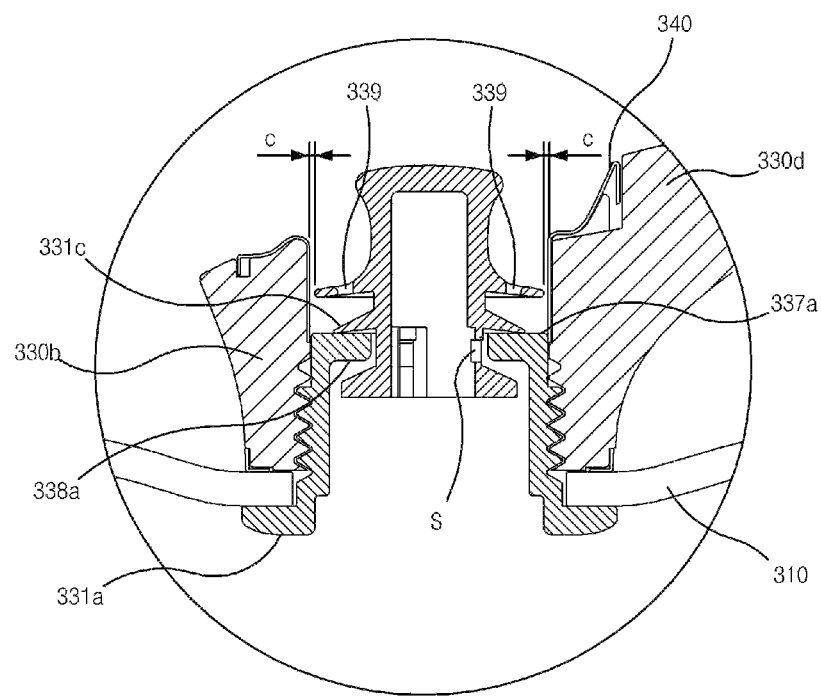
FIG. 10*a* is a cross-sectional view of the check valve in FIG. 8 when vacuum is maintained.
Figure 10B:
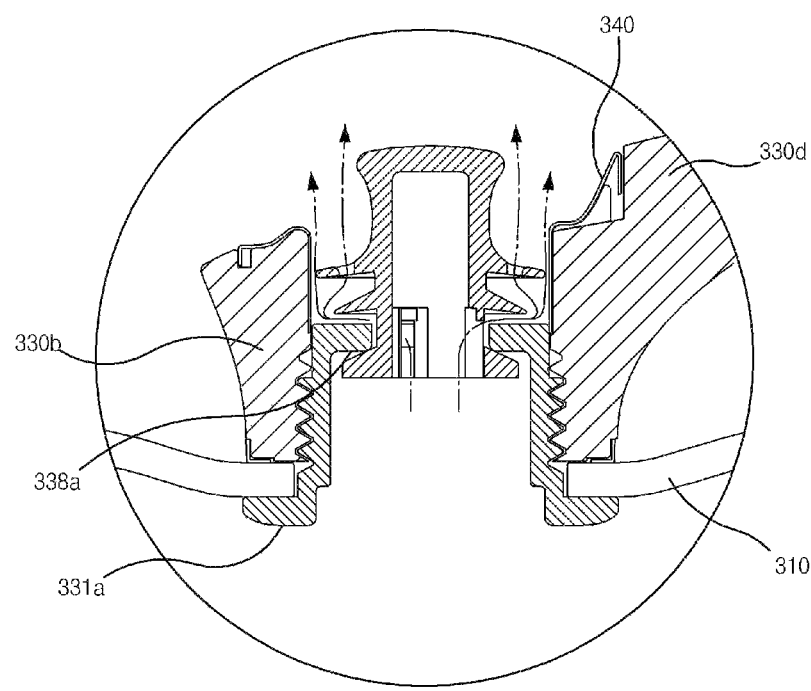
FIG. 10*b* is a cross-sectional view of the check valve in FIG. 8 when overflow prevention and water drop condensation prevention is maintained in accordance with the pressure.
Figure 11:
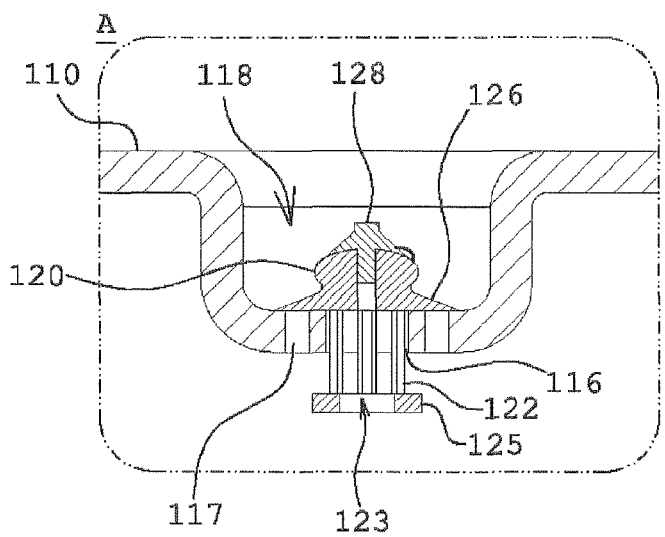
FIG. 11 is an illustration showing operation of a check valve of the prior art.
Figure 11:
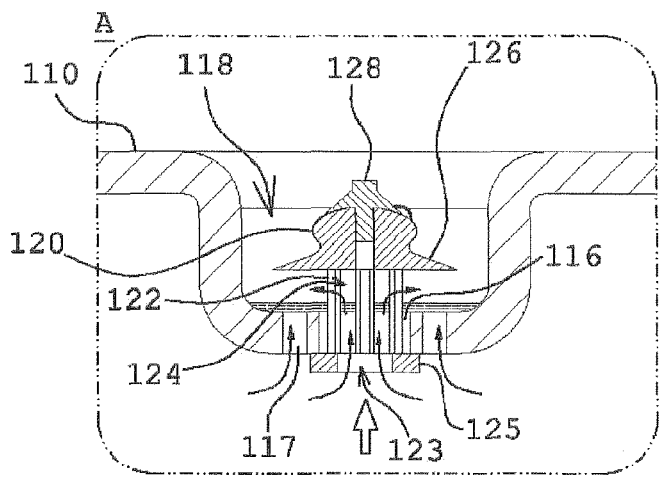

FIG. 1 is a perspective view illustrating a vacuum cooking pot according to a preferred exemplary embodiment of the present invention; FIG. 2 is a cross-sectional view along the line 2-2 in FIG. 1; FIG. 3 is an exploded perspective view illustrating the lid in FIG. 1; FIG. 4*a* is a cross-sectional view of a check valve when vacuum is maintained; FIG. 4*b* is a cross-sectional view of a check valve when overflow prevention is maintained in accordance with the pressure; FIG. 4*c* is a cross-sectional view of a check valve when it is always opened; FIG. 5 is an exploded perspective view illustrating a container in FIG. 1; FIG. 6 is a cross-sectional view along the line 6-6 in FIG. 1; FIG. 7 is a cross-sectional view along the line 7-7 in FIG. 1; FIG. 8 is a perspective view illustrating another check valve according to another exemplary embodiment; FIG. 9 is a perspective view of FIG. 8 showing the bottom thereof; FIG. 10*a* is a cross-sectional view of the check valve in FIG. 8 when vacuum is maintained; FIG. 10*b* is a cross-sectional view of the check valve in FIG. 8 when overflow prevention and water drop condensation prevention is maintained in accordance with the pressure; and FIG. 11 is an illustration showing operation of a check valve of the prior art.

As illustrated in FIGS. 1 and 2, a vacuum cooking pot 100 according to the present invention includes a container 200 having a cooking chamber 200*a*, and a vacuum lid 300 which opens and closes the cooking chamber 200*a* of the container 200.

The container 200 includes a bottom 210 and a sidewall 230 upwardly protruding from the edge of the bottom 210 so as to form a cooking chamber 200*a* inside thereof as shown in FIG. 2 and FIG. 5.

As shown in FIGS. 2 and 3, the vacuum lid 300 includes: a lid body 310; a lid handle 330 installed in the through-hole 311 formed in the center of said lid body 310; a slot 350 formed at the edge of the lid body 310; and a packing 370 mounted in the slot 350.

As illustrated in FIG. 3 and FIGS. 4a to 4c, a lid handle 330 includes: a central hole unit 330a disposed on the through-hole 311; a central cap unit 330b coupled with the central hole unit 330a and supported by the lid body 310; a check valve 330c installed inside of the central hole unit 330a; and an arm 330d initiated from the one side of the central cap unit 330b and protruding towards the radial direction of the lid body 310.

With such configuration of the lid handle 330, a vacuum function, an overflow prevention function, and an erection function can be simultaneously satisfied with one lid handle.

The inside of the central hole unit 330a performs an outlet function for the steam and the like exhausting from the container 200.

A stopper flange 331a is formed at the lower end of the central hole unit 330a.

This stopper flange 331a is stopped by the bottom surface of the through-hole 311 when the top end of the central hole unit 330a is inserted into the through-hole 311 from bottom to top.

In addition, male threads 333a are formed on the outer circumference of the central hole unit 330a.

Female threads 333b for coupling with male threads 333a are formed in the central cap unit 330b.

In a plane view, the arm 330d is initiated from the one side of the central cap unit 330b and protruded towards the radial direction of the lid body 310; in a side view, it is more upwardly slanted as it is directed from the center of the lid body 310 further towards the edge thereof.

Thus, the lid 300 can be stably erected using the end of the arm 330d and the edge of the lid 300.

Meanwhile, as illustrated in FIGS. 4a to 4c, a guide piece 340 for guiding steam upward is installed in the central cap unit 330b.

Especially the guide piece 340 is installed at a point where the central cap unit 330b and the arm 330d meet, and functions as a detour route for detouring (reflecting) the steam and the like to upward direction which is heading directly towards the arm 330d.

For such function as a detour route, a guide piece 340 is installed emulating a wall surrounding a part of the top surface of the central cap unit 330b.

As illustrated in FIGS. 4a to 4c, a check valve 330c which is made of a silicon material whose elastic deformation is easy and harmless to humans includes: an open-close flange 331c disposed on the upper surface 337a of the central hole unit 330a; a top unit 333c formed on the top of the open-close flange 331c; a central hole flange 335c being stopped at the bottom surface of said open-close hole 335a; a connecting section 337c which connects the open-close flange 331c with the central hole flange 335c; and a flange 339c being formed in between the top unit 333c and the open-close flange 331c.

The connecting section 337c includes multiple connecting strips 337c installed apart with a pre-determined separation distance such that a relief path S is formed along the circumference of the central hole flange 335c.

It is advantageous to let the top unit 333c play a role in maintaining vacuum for a long time by downwardly applying weight to the check valve 330c to some degree while it is holdable by hand.

The open-close flange 331c is formed as an outwardly protruding flange type at the bottom end of the top unit 333c to have larger diameter than that of the open-close hole 335a.

The central hole flange 335c has a disk-like shape wherein a through-hole 336 is formed in the center thereof.

With such configuration, the check valve 330c forms a flow path in order for the internal pressure of the cooking chamber 200a to exhaust to the outside through the through-hole 336 of the central hole flange 335c and the relief path S, while the check valve 330c blocks the reverse flow path.

In addition, as illustrated in FIGS. 4a to 4c, it is advantageous in that a stopper protrusion 338 is formed on the outer circumference between the top end and the bottom end of the connecting strips 337c.

If the stopper protrusion 338 is stopped at the upper surface 337a of the open-close hole 335a, as shown in FIG. 4c, it is very useful for cooking foods requiring overflow prevention since the relief path S between the top end of the connecting strips 337c and the stopper protrusion 338 is always opened to the outside.

Meanwhile, it is advantageous in that the diameter of the flange 339c is greater than that of the open-close flange 331c for performing secondary umbrella function but less than that of the through-hole of the central cap unit 330b such that steam and the like can be exhausted through the gap c between the inner circumference of the central cap unit 330b and the flange 339c.

In other words, the flange 339c performs umbrella function fully suppressing secondary overflows when foreign substances are overflowed passing through the open-close flange 331c.

Meanwhile, it is advantageous in that multiple holes 339 are formed in the flange 339c as illustrated in FIGS. 8 to 10b.

Since the gap c is very narrow water drops are condensed due to dwelling time of the exhausted steam caused by the bottle neck effect. If water drops are condensed, there are concerns of getting messy or burn caused by the outward splashing of the water drops due to the pressure when the steam is continuously exhausted.

Thus, the holes 339 act as exhausting paths for the steam as shown in FIG. 10b, and prevent condensation of water drops in the gap c by reducing bottle neck effect for the exhausting steam.

Figure 3A:
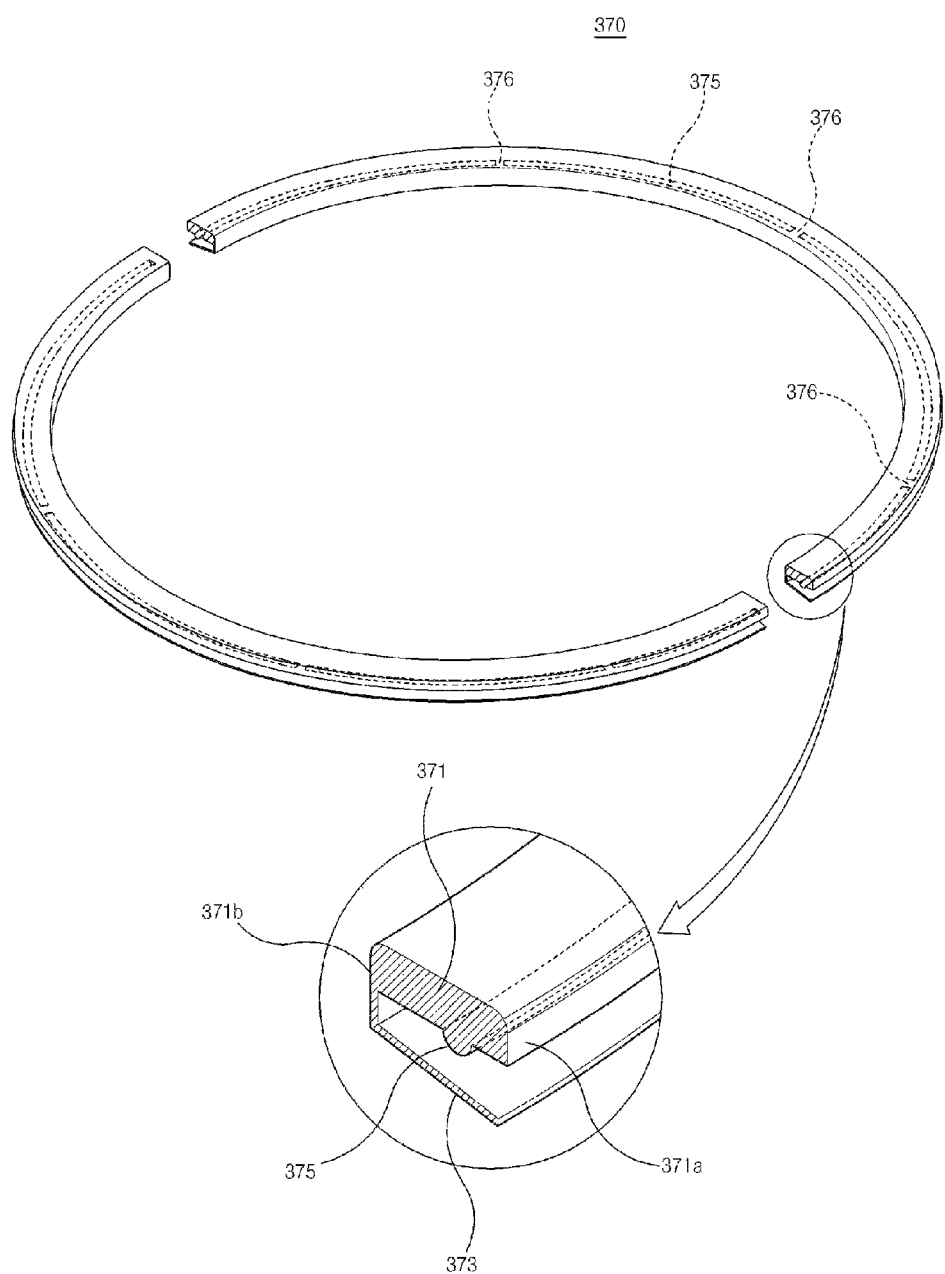
FIG. 3*a* is a perspective view illustrating the cross-section of the packing in FIG. 3.

As illustrated in FIG. 3a, the packing 370 having a shape of a single closed loop chain includes: a packing body 371; and a packing flange 373 supported by the rear end 371b and vertically movable with respect to the packing body 371. FIG. 3a is a (perspective) cross-sectional view illustrating a packing which is divided into two pieces to show the cross-section thereof.

In addition, a downwardly protruding round ridge 375 is formed between the front end 371a and the rear end 371b of the lower surface of the packing body 371 such that the packing flange 373 is line-contacted with the round ridge 375 therefore surface-to-surface contact with the lower surface of the packing body 371 is prevented, hence the sticking is fully suppressed.

In addition, channels 376 are formed in the round ridge 375 along the circumference thereof such that the continuous line-contact becomes a discontinuous line-contact therefore the sticking of the packing flange 373 to the round ridge 375 can be further prevented.

The slot 350 includes an inner protrusion 351 and an outer protrusion 353 which are downwardly protruding from the bottom surface of the circumference of the lid body 310, and has a shape of a cap whose bottom surface is opened.

The packing 370 is mounted in this slot 350 by insertion, and the packing 370 is confined by the outer side, the inner side, and the top side therefore an outward separation (of the packing from the slot) due to thermal expansion is fully prevented Especially, in the inner surface of the outer protrusion 353, a stopper-rim 356 where the front end 371a of the lower surface of the packing body 371 is stopped.

Thus, the packing 370 is stopped by the stopper-rim. 356 thereby preventing a downward separation; hence, an arbitrary separation of the packing 370 in any direction is fully prevented even when the vacuum lid 300 is continuously opened and closed.

Since the slot 350 has a shape of a cap or an upside-down U, it covers and encompasses the inside and outside of the top end 231 of the sidewall 230 of the container 200, thus the vacuum efficiency (especially vacuum holding time) can be significantly increased by fully suppressing the inflow of the air from the outside into the inside.

When such vacuum cooking pot 100 is boiled, the internal pressure of the container 200 is released through the check valve 330c as it is expanded (refer to FIG. 4b); when the boiling of the pot 100 is stopped and cooled down, the lid 300 and the check valve 330c are pulled down as the internal pressure of the container 200 is reduced.

The degree of pulling down of the lid 300 becomes equal to the degree of upward pressing of the packing flange 373.

Thus, since it is made such that inflow of external air through the packing flange 373 and the check valve 330c is inhibited, a vacuum is created inside of the cooking chamber 200a of the pot (refer to FIG. 4a).

Vacuum state can be released by boiling or momentarily holding up the check valve 330c.

Meanwhile, in a configuration of the check valve 330c, if the lid 300 is occasionally lifted when the food is boiling, then the food firstly overflows over the top end 231 of the container 200 while being lifted.

To prevent this, it is advantageous in that a lid locking member 700 is further installed in the container handle 500 installed in the container 200.

As shown in FIG. 2, a container handle 500 is fixed to the sidewall 230 of the container 200 using screws.

As illustrated in FIGS. 5 to 7, a lid locking member 700 includes: a locking slider 710; a guide member 730 guiding the locking slider 710 towards radial direction with respect to the container handle 500; and an elastic clip 750 which is mounted in the container handle 500 and determines the position of the locking slider 710

The locking slider 710 is slidable along the top surface 510 of the container handle 500.

In addition, the top surface 510 of the container handle 500 includes a slot recessed slightly downward, and the both of the side surfaces 511 and 513 (of the slot) also guide the both of the side ends 711 and 713 of the locking slider 710.

The guide member 730 includes: a guide rail section 731 formed in the lower surface of the locking slider 710; and a guide rail slot section 733 guiding the guide rail section 731 in the container handle 500.

The guide rail section 731 having a protruded shape includes a guide rail 731a and a connecting piece 731b which connects the locking slider 710 and the guide rail 731a.

The guide rail slot section 733 includes: a guide rail slot 733a having a box shape for sliding of the guide rail 731a; and a recessed slot 733b recessed on the top surface of the guide rail slot 733a so as to arrange the connecting piece 731b to be slidable.

In addition, it is advantageous in that a deco unit 600 is installed on the upper surface of the container handle 500.

The deco unit 600 includes: an intervening plate 610 which intervenes between the upper surface 510 of the container handle 500 and the bottom surface of the locking slider 710; and a deco piece 630 formed at the back end of the intervening plate 610.

A slot 611 corresponding to the recessed slot 733b is formed in the intervening plate 610.

A hook 612 being hooked by the back end of the container handle 500 and the lower end of the recessed slot 733b, is formed in the intervening plate 610 and the deco piece 630 as shown in FIG. 2.

The deco piece 630 is shaped to have practically same part thickness as that of the locking slider 710, thus they look like a single component in appearance.

In addition, as shown in FIG. 7, a guide protrusion 613 is formed on the upper surface of the intervening plate 610; a guide protrusion groove 713 sliding with the guide protrusion 613 is formed at the bottom surface of the locking slider 710.

The elastic clip 750 which is implemented with plate springs 751 and 753 having a shape of strip, applies elastic pressure to both sides of the guide rail 731a and determines the position of the locking slider 710.

A keep-locking slot 752 and a release-locking slot 754 are formed in the plate springs 751 and 753.

In addition, in the guide rail 731a is coupled to the keep-locking slot 752 or the release-locking slot 754 so as to clearly inform the position thereof.

The distance between the keep-locking slot 752 and the release-locking slot 754 is the sliding distance of the locking slider 710.

The elastic clip 750 is supported by the supporting plate 755 like a cantilever, and the supporting plate 755 is fixed to the container handle 500 with screws.

Meanwhile, it is advantageous in that the gap maintaining pieces 751a and 753a are formed by bending on the free ends of the plate springs 751 and 753.

As shown in FIG. 6, the gap maintaining pieces 751a and 753a apply enough elastic pressure to the locking slider 710 by creating gaps between the both sides of the guide rail slots 733a and the plate springs 751 and 753.

Through the implementation of such lid locking member 700, a vacuum function and a reliable overflow prevention function can be realized.

Although the present invention is described with reference to the preferred exemplary embodiment, it will be apparent to the person of ordinary skill in the art that various changes and alterations of the present invention can be made within the scope of the present invention without departing from the spirit and the scope thereof written in the claims described herein below.

| Description of Symbols | |
|---|---|
| 100: vacuum cooking pot, | 200: container |
| 200a: cooking chamber, | 210: bottom |
| 230: side wall, | 231: upper end |
| 300: vacuum lid, | 310: lid body |
| 311: through-hole, | 330: lid handle |
| 330a: central hole unit, | 330b: central cap unit |
| 330c: check valve, | 330d: arm |
| 331a: stopper flange, | 331c: open-close flange |
| 333a: male threads, | 333b: female threads |
| 333c: top unit, | 335a: open-close hole |
| 335c: central hole flange, | 336: through-hole |
| 337a: upper surface, | 337c: connecting section (connecting strip) |
| 338: locking protrusion, | 338a: bottom surface |
| 339c: flange, | S: relief path |

-continued

Description of Symbols

| | |
|---|---|
| 340: guide piece, | 350: slot |
| 351: inner protrusion, | 353: outer protrusion |
| 355: downward bending piece, | 356: stopper-rim |
| 370: packing, | 371: packing body |
| 371a: front end, | 371b: rear end |
| 373: packing flange, | 375: round ridge |
| 376: channel, | 500: container handle |
| 510: top surface, | 600: deco unit |
| 610: intervening plate, | 611: slot |
| 612: hook, | 613: guide protrusion |
| 630: deco piece, | 700: lid locking member |
| 710: locking slider, | 713: guide protrusion groove |
| 730: guide member, | 731: guide rail section |
| 731a: guide rail, | 731b: connecting piece |
| 733: guide rail slot section, | 733a: guide rail slot |
| 733b: recessed slot, | 750: elastic clip |
| 751, 753: plate spring, | 752: keep-locking slot |
| 754: locking-release slot, | 755: supporting plate |
| 751a, 753a: gap maintaining piece | |

What is claimed is:

1. A lid for a vacuum cooking pot including:
 a lid body;
 a slot formed at an edge of said lid body;
 a vacuum packing mounted in said slot; and
 a lid handle installed in the center of said lid body, wherein said lid handle includes:
  a central hole unit disposed in a through-hole formed in the center of said lid body;
  a central cap unit coupled with said central hole unit and supported by said lid body; and
  a check valve installed inside of said central hole unit, wherein the check value includes:
   an open-close flange disposed above an open-close hole formed in said central hole unit;
   a top unit formed on the top of said open-close flange;
   a central hole flange disposed under said open-close hole;
   a connecting section connecting said open-close flange with said central hole flange to form a relief path; and
   a flange being formed in between said top unit and said open-close flange.

2. A lid for a vacuum cooking pot according to claim 1, wherein a diameter of said flange is greater than that of said open-close flange but smaller than that of the through-hole of said lid body.

3. A lid for a vacuum cooking pot according to claim 2, wherein multiple holes are formed in said flange.

4. A lid for a vacuum cooking pot according to claim 1, wherein an arm initiated from said central cap unit and protruding towards a radial direction of said body is further formed.

5. A lid for a vacuum cooking pot according to claim 4, wherein a guide piece for guiding steam to upward direction is installed in said central cap unit.

6. A vacuum cooking pot including:
 a container;
 a lid for opening and closing said container; and
 a container handle installed on said container, wherein said lid includes:
  a lid body;
  a slot formed at an edge of said lid body;
  a packing mounted inside of said slot; and
  a lid handle installed on the center of said lid body, wherein said lid handle includes:
   a central hole unit disposed in a through-hole formed in the center of said lid body;
   a central cap unit coupled with said central hole unit and supported by said lid body; and
   a check valve installed inside of said central hole unit,
 wherein a lid locking member is further installed in said container handle, said lid locking member including:
  a locking slider,
  a guide member guiding said locking slider towards radial direction with respect to said container handle; and
  an elastic clip mounted in said container handle that determines the position of said locking slider;
 wherein said guide member includes:
  a guide rail formed at a bottom surface of said locking slider; and
  a guide rail slot section guiding said guide rail, wherein said elastic clip is disposed in said guide rail slot section for applying an elastic pressure to sides of said guide rail slot section.

7. A vacuum cooking pot according to claim 6, wherein a keep-locking slot and a release-locking slot are formed in said elastic clip, and a protrusion is formed on said guide rail for coupling with said keep-locking slot or said release-locking slot.

8. A vacuum cooking pot according to claim 7, wherein a gap maintaining piece for providing a gap between the sides of said guide rail slot section and said elastic clip is formed.

9. A lid for a vacuum cooking pot according to claim 6, wherein an arm initiated from said central cap unit and protruding towards a radial direction of said body is further formed.

10. A lid for a vacuum cooking pot according to claim 9, wherein a guide piece for guiding steam to upward direction is installed in said central cap unit.

11. A lid for a vacuum cooking pot according to claim 2, wherein an arm initiated from said central cap unit and protruding towards a radial direction of said body is further formed.

12. A lid for a vacuum cooking pot according to claim 11, wherein a guide piece for guiding steam to upward direction is installed in said central cap unit.

13. A lid for a vacuum cooking pot according to claim 3, wherein an arm initiated from said central cap unit and protruding towards a radial direction of said body is further formed.

14. A lid for a vacuum cooking pot according to claim 13, wherein a guide piece for guiding steam to upward direction is installed in said central cap unit.

* * * * *